April 9, 1957  R. M. MEYER  2,787,944
IMPLEMENT LIFT

Filed July 5, 1952  2 Sheets-Sheet 1

INVENTOR.
REYNOLD M. MEYER
BY
Charles R. Wurmer
ATTORNEY

April 9, 1957 R. M. MEYER 2,787,944
IMPLEMENT LIFT

Filed July 5, 1952 2 Sheets-Sheet 2

INVENTOR.
REYNOLD M. MEYER
BY
ATTORNEY

United States Patent Office 2,787,944
Patented Apr. 9, 1957

2,787,944

IMPLEMENT LIFT

Reynold M. Meyer, Andale, Kans.

Application July 5, 1952, Serial No. 297,257

3 Claims. (Cl. 97—47.63)

This invention relates in general to lifts for agricultural implements and in particular to a grain drill which may be secured to and activated by a tractor.

A grain drill is but one of the many devices which may be carried and motivated by a tractor. It is very desirable to be able to quickly and easily attach and remove the drill from the tractor and also, during operation of the drill it is desirable to be able to raise and lower the drill at will for transporting it from one point to another without contacting the soil.

The primary object of my invention is to provide a drill which may be entirely carried and operated by the tractor and does not have to depend on traction with the soil for operation.

Another object of my invention is to provide a drill supported by and secured to a tractor and hydraulically operated thereby to raise and lower the drill as desired.

And still another object of the invention is to provide a tractor drawn and operated drill which can be quickly and easily detached from the tractor.

Other objects and advantages as well as the construction and operation of my invention will be better understood by reference to the following specifications in connection with the accompanying drawings in which.

Figure 1:
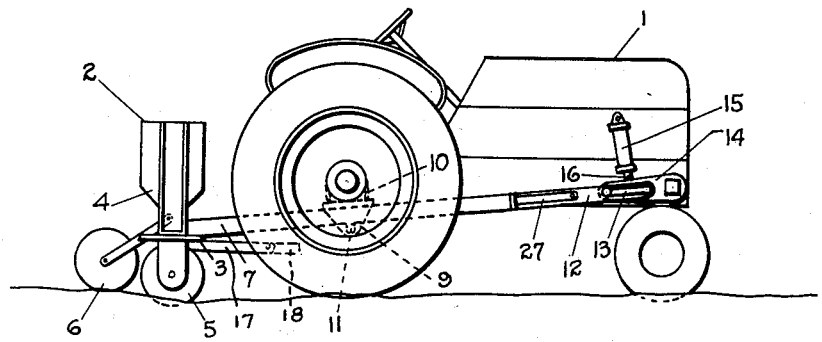
Fig. 1 is a side view of my device attached to a tractor, the device being shown in soil engaging position.

Referring now to the drawings by numerals of reference, 1 designates a tractor of standard construction, the drill 2 comprising a frame 3 carrying seed hopper 4, disc openers 5 and press or ground wheels 6.

The drill is provided with a pair of forwardly extending arms or beams 7 secured to the frame 3 of the drill in a suitable manner. A racking support between the beams 7 and axle housing 8 of the tractor is provided by support members 9, each rockably supported on the axle housing 8 by U-bolt 10, the beam slidably resting on cross or pivot pin 11.

The forward end 12 of each beam 7 has an elongated opening 13 in which the end of arm 14 is slidably carried. A hydraulic piston 15 is carried on each side of the tractor and has one end 16 pivotally connected to the arm 14, said hydraulic piston being operable from the hydraulic system of the tractor.

Figure 2:
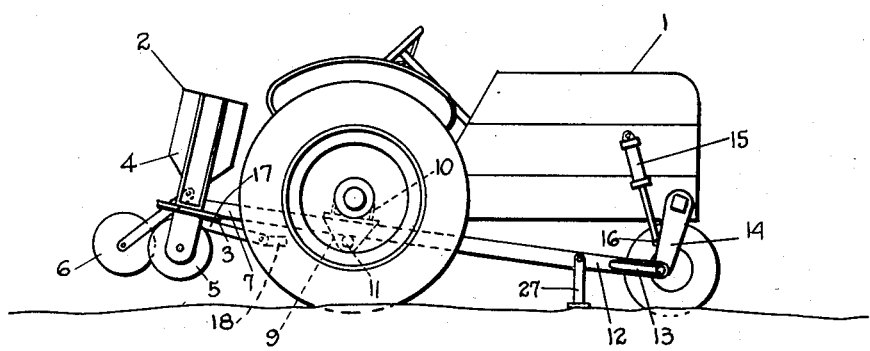
Fig. 2 is a similar view of the device raised clear of the soil so that it can be transported without damage thereto and without hindering movement of the tractor.
Figure 3:
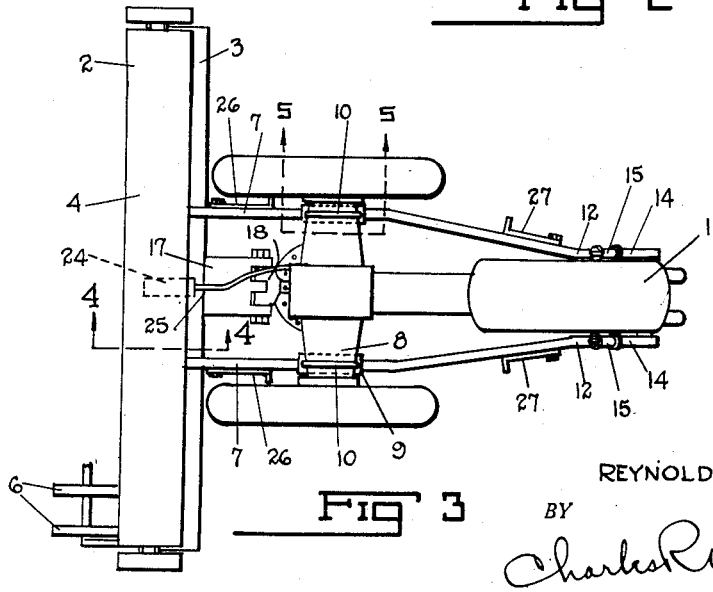
Fig. 3 is a top plan view of the drill secured to the tractor.
Figure 4:
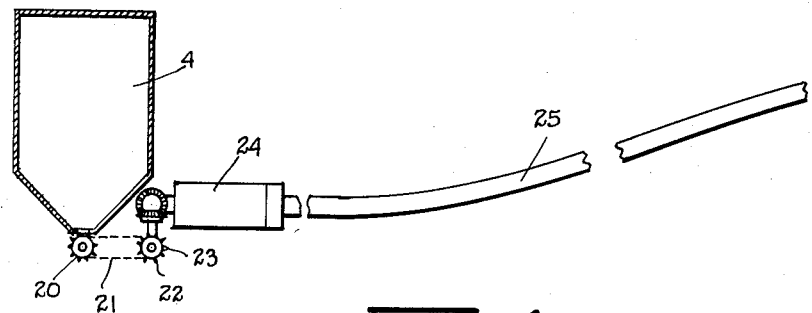
Fig. 4 is an enlarged detail cross sectional view on the line 4—4 of Fig. 3, showing the seeder trough and driving means from the seeding mechanism.
Figure 5:
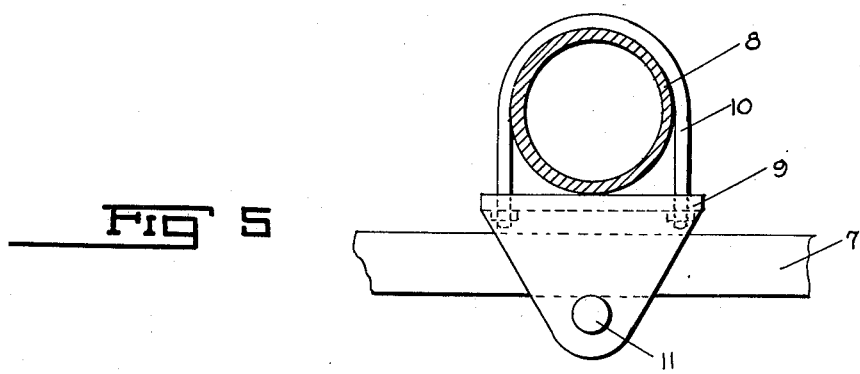
Fig. 5 is an enlarged cross sectional view on the line 5—5 of Fig. 3 showing a detail of the drill beam and its rocking support on the tractor.

As shown in Figs. 1 and 2, the hydraulic piston 15 may be withdrawn, pulling arms 14 upward, rocking beam 7 by means of support 9 so that the drill is in lowered position with disc openers 5 in engagement with the soil. The long lever arm of the beams 7 between the pivot pins 11 and the arms 14 makes it possible to raise a considerable load in the drill with a small amount of energy in the hydraulic pistons, when said pistons are extended to drill raising position.

Figure 6:
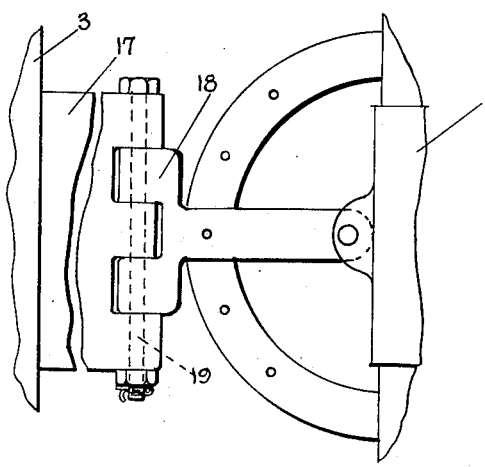
Fig. 6 is a fragmentary plan view of the connecting member between the drill and the tractor hitch to provide freedom of pivotal movement of the drill.

The actual pulling load of the drill is not applied to the beams but is taken up by a suitable connection between the drill and the tractor. Fig. 6 shows a portion of frame 3, a three prong member 17 rigidly carried by the frame, the bifurcated hitch 18 on the tractor being pivotally carried by member 17 by suitable pin 19. The pivotal connection will permit rocking movement between the drill and tractor in a vertical plane about a transverse horizontal axis.

Control of the seed hopper 4 is accomplished by suitable sprocket control 20, chain 21 and sprocket 22 on the longitudinal shaft 23, a torque drive member 24 being provided between the shaft 23 and drive cable 25 which may terminate in suitable power connection on the tractor. The torque drive member 24 may be of any suitable construction and set to cut the driving connection between the tractor and the drill should the seeding mechanism become clogged, thus preventing damage to the mechanism. It is obvious that any other suitable driving connection between the tractor and seeder may be provided without changing the scope of this invention.

Suitable shoes 26 and 27 may be secured to the drill and beams 7 to keep the device elevated and disc openers free of the ground when the drill is not in use.

In order to attach the drill to the tractor it is necessary only to insert beams 7 in support members 9, make the connection between the ends of the beams and the arms 14, connect bifurcated hitch 18 to three prong member 17, and connect the flexible drive cable 25 to a power source on the tractor.

From the foregoing it will be seen that I have provided a relatively simple tractor drawn drill, easily and quickly secured to the tractor, with hydraulically operated means for raising and lowering the drill. I may also provide a torque connection between the tractor and the drill for operating the seeding mechanism so as to disconnect same to prevent damage thereto in the event the seeding mechanism becomes clogged.

It is obvious that changes in form, proportion and details of construction may be resorted to without departing from the spirit of my invention and I reserve all rights to such changes as come within the scope of these specifications and the claims which follow.

What I claim as new and desire to secure by Letters Patent is:

1. In combination with a tractor, an implement connection comprising a connecting member on the implement in direct pivoted connection with the tractor permitting rocking of the implement in a vertical plane about a transverse horizontal axis, implement control means including longitudinal beams rigidly secured to the implement one on each side of the tractor, an elongated slot in the forward end of each longitudinal beam, a pivoted arm secured on each side of the tractor, the free end of each pivoted arm being slidably carried in the elongated slot of its respective beam, a rockable support secured to the tractor intermediate the ends of each longitudinal beam, each longitudinal beam being slidably carried in its respective rockable support, and an actuating means operably connected to the pivoted arms for operating the implement control means.

2. In combination with a tractor having a rear axle housing, an implement connection comprising a connecting member on the implement in direct pivoted connection with the tractor permitting rocking of the implement in a vertical plane about a transverse horizontal axis, implement control means including longitudinal beams rigidly secured to the implement one on each side of the tractor, an elongated slot in the forward end of each longitudinal beam, a pivoted arm secured on each side of the tractor, the free end of each pivoted arm being slidably carried in the elongated slot of its respective beam, a rockable support carried on each side of the rear axle housing of the tractor, each longitudinal beam being slidably carried in its respective rockable support, and an actutaing means operably connected to the pivoted arms and actuating the implement control means.

3. In combination with a tractor, an implement connection comprising a connecting member on the implement in direct pivoted connection with the tractor permitting rocking of the implement in a vertical plane about a transverse horizontal axis, implement control means including longitudinal beams rigidly secured to the implement one on each side of the tractor and extending toward the front thereof, an elongated slot in the forward end of each longitudinal beam, a pivoted arm secured on each side of the tractor adjacent the front end thereof, the free end of each pivoted arm being slidably carried in the elongated slot of its respective beam, a rockable support on each side of the tractor intermediate the ends of each longitudinal beam, each longitudinal beam being slidably carried in its respective rockable support, and an actuating means connected to the pivoted arms and actuating the implement control means.

References Cited in the file of this patent

UNITED STATES PATENTS

| | | |
|---|---|---|
| 729,275 | Castelin | May 26, 1903 |
| 1,117,027 | Gelink | Nov. 10, 1914 |
| 1,148,420 | Wins et al. | July 27, 1915 |
| 1,858,749 | Paterson | May 17, 1932 |
| 2,205,997 | Wallace et al. | June 25, 1940 |
| 2,332,713 | Hand | Oct. 26, 1943 |
| 2,414,114 | Martin | Jan. 14, 1947 |
| 2,415,251 | Leavitt | Feb. 4, 1947 |
| 2,547,143 | Speicher | Apr. 3, 1951 |

FOREIGN PATENTS

| | | |
|---|---|---|
| 967,903 | France | Apr. 5, 1950 |
| 986,018 | France | July 26, 1951 |
| 586,025 | Great Britain | Mar. 4, 1947 |
| 611,324 | Great Britain | Oct. 28, 1948 |